United States Patent
Gancarz (10) Patent No.: US 11,212,084 B2
(45) Date of Patent: Dec. 28, 2021

(54) SYSTEM AND A METHOD FOR SIGNING TRANSACTIONS USING AIR-GAPPED PRIVATE KEYS

(71) Applicant: Fundacja "Blockchain Development Foundation", Lodz (PL)

(72) Inventor: Kamil Rafal Gancarz, Zgierz (PL)

(73) Assignee: FUNDACJA "BLOCKCHAIN DEVELOPMENT FOUNDATION", Lodz (PL)

( * ) Notice: Subject to any disclaimer, the term of this patent is extended or adjusted under 35 U.S.C. 154(b) by 160 days.

(21) Appl. No.: 16/503,513

(22) Filed: Jul. 4, 2019

(65) Prior Publication Data
US 2020/0028675 A1    Jan. 23, 2020

(30) Foreign Application Priority Data
Jul. 21, 2018  (EP) .................................. 18461588

(51) Int. Cl.
*H04L 9/08* (2006.01)
*G06Q 20/40* (2012.01)

(52) U.S. Cl.
CPC ..... *H04L 9/0827* (2013.01); *G06Q 20/40145* (2013.01); *H04L 9/0869* (2013.01)

(58) Field of Classification Search
CPC ..... H04L 9/0827; H04L 9/0869; H04L 63/18; H04L 63/0861; G06Q 20/40145; G06Q 2220/00; G06Q 20/401
See application file for complete search history.

(56) References Cited

U.S. PATENT DOCUMENTS

| | | | |
|---|---|---|---|
| 8,984,275 B2 | 3/2015 | Ozgit | |
| 2010/0318785 A1* | 12/2010 | Ozgit | .................. H04L 63/0209 713/154 |
| 2011/0187332 A1* | 8/2011 | Salvestrini | ............. H05B 47/10 323/234 |

(Continued)

FOREIGN PATENT DOCUMENTS

| | | |
|---|---|---|
| EP | 3506587 A1 | 7/2019 |
| WO | 2017127879 A1 | 8/2017 |

OTHER PUBLICATIONS

Hossein Bidgoli: "Handbook of Information Security, Threats, Vulnerabilities, Prevention, Detection, and Management—vol. 3" in: "Handbook of Information Security, Threats, Vulnerabilities, Prevention, Detection, and Management—vol. 3", Jan. 3, 2006 (Jan. 3, 2006), Wiley, XP055526176, ISBN: 978-0-471-64832-1.

*Primary Examiner* — Tongoc Tran
(74) *Attorney, Agent, or Firm* — Mark M. Friedman (57) ABSTRACT

A system for signing transactions. The system includes a first module with a communication interface to a public network; and a controller to handle a transaction with a Blockchain network or a transaction server accessible at the public network. The system also includes a second module with a random number generator; and a secure controller to generate seed words and private keys. The system further includes a bridge module with a controller; and a switch to selectively connect the data interface of the bridge module to either the data interface of the first module or the data interface of the second module such that the data interface of the first module is never connected with the data interface of the second module.

13 Claims, 6 Drawing Sheets

(56) References Cited

U.S. PATENT DOCUMENTS

| | | | |
|---|---|---|---|
| 2015/0341209 A1* | 11/2015 | Wittenschlaeger | H04L 45/04 |
| | | | 709/222 |
| 2018/0213001 A1* | 7/2018 | Zamir | H04L 63/1416 |
| 2019/0354970 A1* | 11/2019 | Di Iorio | G06Q 20/3823 |
| 2019/0372779 A1 | 12/2019 | Monica et al. | |

* cited by examiner

Fig. 6

SYSTEM AND A METHOD FOR SIGNING TRANSACTIONS USING AIR-GAPPED PRIVATE KEYS

TECHNICAL FIELD

The present disclosure relates to a system and a method for signing transactions. In particular, the present disclosure relates to a convenient method, from a user's perspective, for air gapping in an electronic device when managing digital assets, such as cryptocurrency or Blockchain (or similar systems) stored content.

BACKGROUND

"Air Gapping" is a known procedure related to keeping a computing machine off any network connectivity, or at least off a public network such as the Internet. In other words, an air gap, air wall or air gapping is a network security measure employed on one or more computers to ensure that a secure computer network is physically isolated from unsecured networks, such as the public Internet or an unsecured local area network.

As a result, the air-gapped computing machine is a closed system (in terms of information, signals, etc.), that is inaccessible to remote entities and can be operated only manually by a user (operator).

A disadvantage of air gapping is that transferring information between the air-gapped computing machine and a remote entity is labor-intensive, often involving human security analysis of prospective software applications or data to be entered onto the air-gapped machine and possibly even human manual re-entry of the data following security analysis.

Furthermore, an air-gapped machine is typically a fully separate hardware system, which requires operating and maintaining two systems, which is inconvenient, especially in case of so-called electronic wallets, where in addition to the electronic device or a computer program functioning as the wallet, a user must carry a separate air-gapped transaction signing device (for example, a code generating token that is devoid of network connectivity, or a secured cold-storage hardware wallet, which stores private keys allowing to access to Blockchain stored content or to spend digital assets, such as cryptocurrencies).

In view of the above, there is a need to design a system, usable in particular for electronic wallet applications, which would not require two separate devices and which would be more convenient to use. There is also a need to provide an improved system and method for signing transactions over a virtual air gap.

SUMMARY

The invention relates to a system for signing transactions. The system comprises a first module comprising: a communication interface to a public network; a controller configured to handle a transaction with a Blockchain network or a transaction server accessible at the public network; and a data interface for communicating with the controller. The system further comprises a second module comprising: a random number generator for generating random sequences; a secure controller configured to generate seed words and private keys based on the random sequences generated by the random number generator and to store the seed words and the private keys and to sign the transaction request by generating a signed transaction; and a data interface for communicating with the secure controller. The system further comprises a bridge module comprising: a controller; a data interface for communicating with the controller; and a switch configured to selectively connect the data interface of the bridge module to either the data interface of the first module or the data interface of the second module such that the data interface of the first module is never connected with the data interface of the second module. The controller is configured to receive a transaction request from the first module, pass the transaction request to the second module, receive the signed transaction from the second module and pass the signed transaction to the first module.

The switch may be a single pole, double throw (SPDT) switch.

The secure controller of the second module may be further configured to store biometric data.

The second module may comprise a biometric sensor configured to convert a biometric trail of a person into an electrical signal for transaction authorization.

The switch may be further configured to provide power to the second module only when the data interface of the bridge module is connected with the data interface of the second module.

The system may further comprise a wipe module configured to invoke a wipe function at the second module to delete the stored seed words and private keys, and to wipe all transaction and financial data from the first module.

The second module may be integrated with the bridge module in a common housing.

The first module may be integrated with the second module and the bridge module in a common housing.

The data interface of the second module may comprise an input data buffer and an output data buffer.

The random number generator of the second module may be a hardware entropy generator.

The random number generator of the second module may be a software entropy generator.

The invention also relates to a method for signing transactions using a system for signing transactions as described herein. The method comprises the steps of: connecting the first module to the public network; setting up transaction details; receiving acceptance that said transaction is to be authorized; sending the transaction request to the bridge module; disconnecting the first module from the bridge module; connecting the bridge module to the second module; sending the transaction request from the bridge module to the second module; authorizing the transaction via the second module; signing the transaction with the private key stored in the second module to generate the signed transaction; sending the signed transaction from the second module to the bridge module; disconnecting the second module from the bridge module; connecting the first module to the bridge module; sending the signed transaction from the bridge module to the first module; and sending the signed transaction from the first module to the Blockchain network or to the transaction server.

The method may further comprise, when a user does not authorize a transaction during a predefined number of consecutive attempts at the second module, invoking a wipe function at the second module to delete the stored seed words and private keys, and to wipe all transaction and financial data from the first module.

BRIEF DESCRIPTION OF THE DRAWINGS

These and other objects presented herein, are accomplished by providing a system and method for signing transactions over a virtual air gap, using air-gapped private keys. Further details and features of the present disclosure, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DETAILED DESCRIPTION

Figure 4:
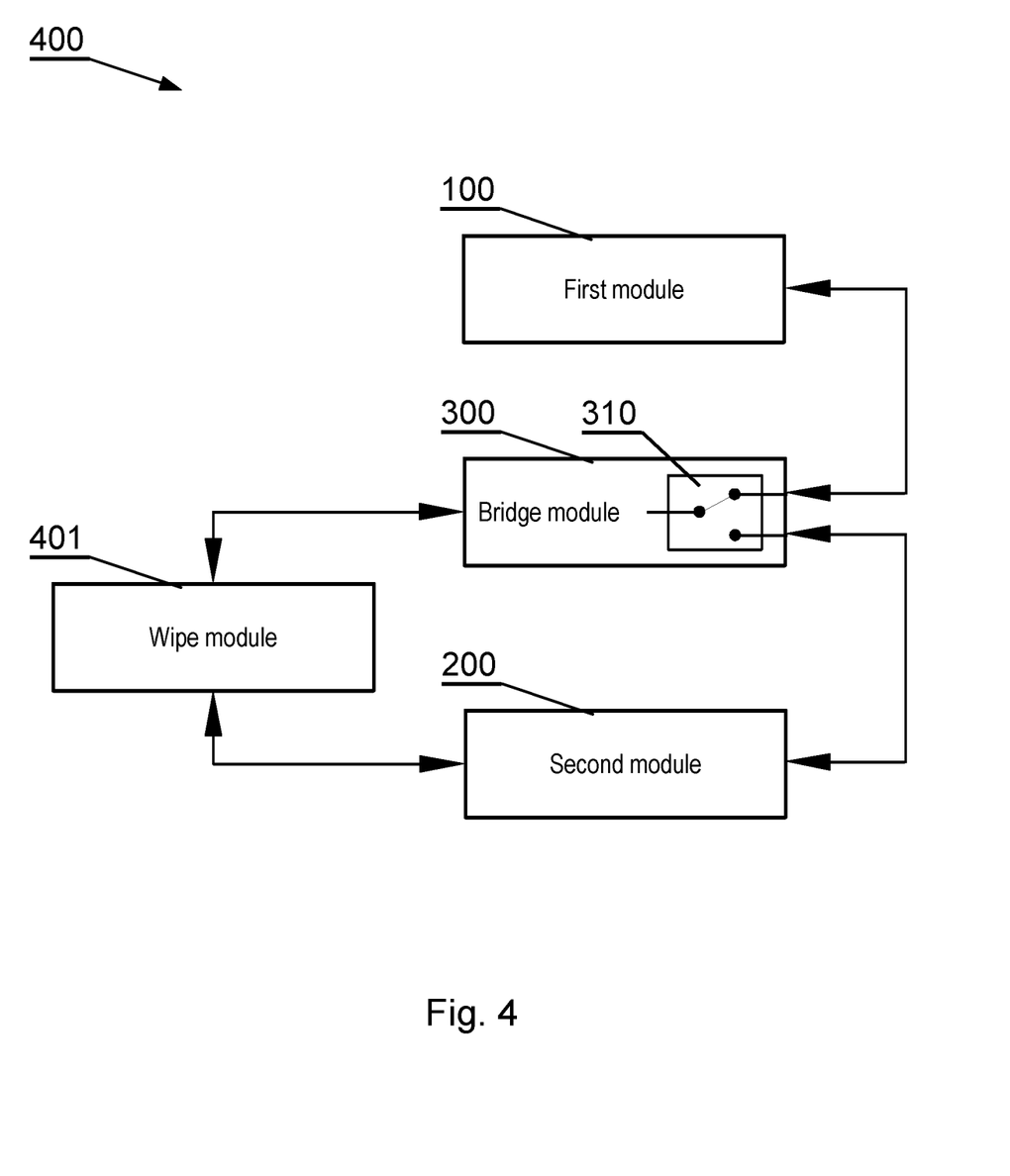
FIG. 4 shows an overview of the system comprising the first module, the second module and the bridge.

The system presented herein, having a general structure as shown in FIG. 4 can be configured in particular to provide efficient, convenient and quick real-time payments using cryptocurrencies (electronic wallet for cryptocurrencies) or can be configured for signing, uploading, or accessing content stored on Blockchain (or similar systems) based distributed leaders, such as to not require external device(s) for transaction signing, while provide at the same time security measures typical for an air-gapped machine.

The system is particularly useful for use with cryptocurrencies, but it can be also used for electronic wallets of regular currencies (e.g. EUR, USD), especially when tokenized to Blockchain based ledgers or similar systems.

The system may be realized using dedicated components or custom made FPGA (field-programmable gate array) or ASIC (Application-Specific Integrated Circuit) circuits.

Figure 1:
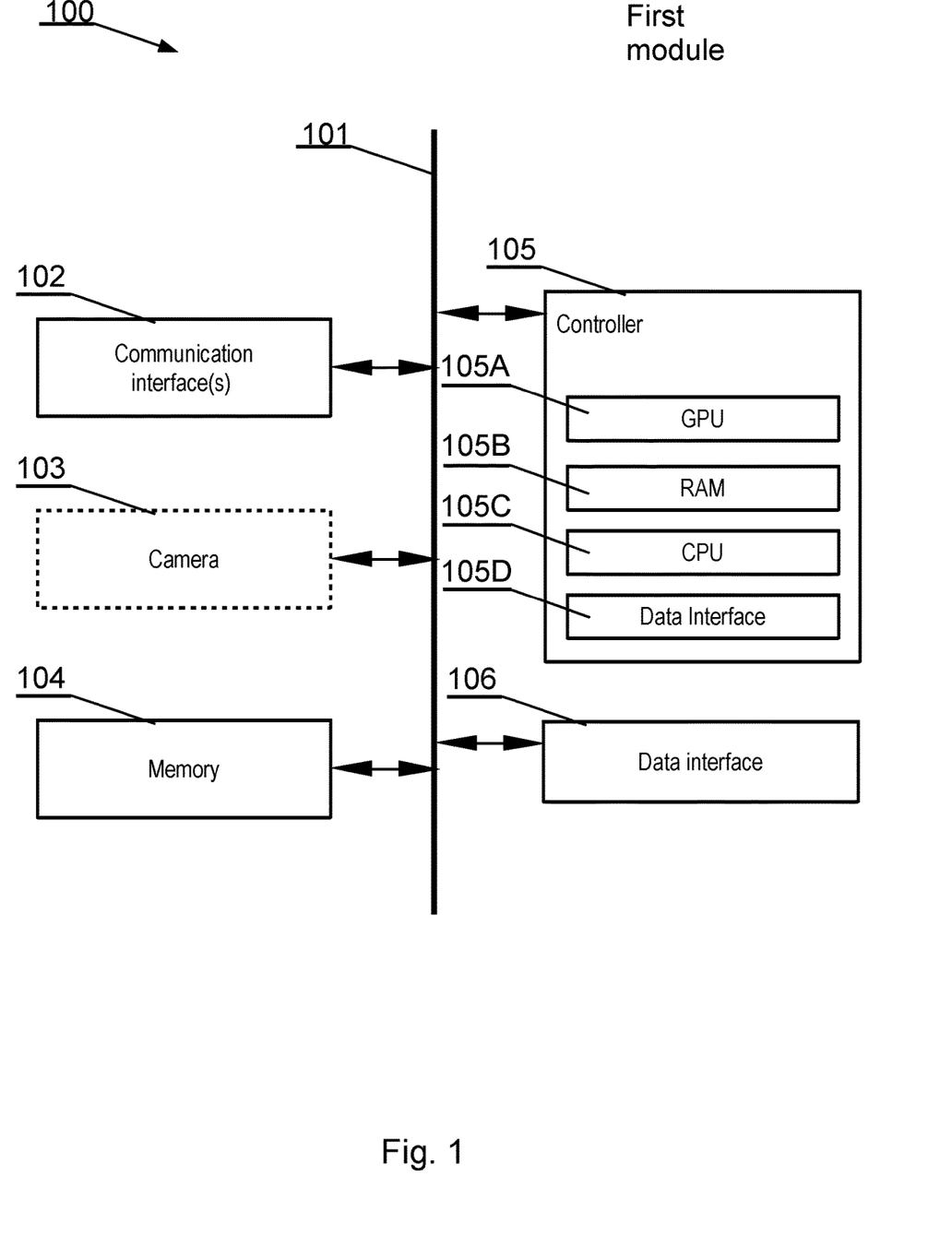
FIG. 1 shows a diagram of an Internet-connected, first module of the system presented herein.

FIG. 1 shows a diagram of a first module 100 of the system, which is connected to the Internet (or in general, any public network). The first module 100 is responsible for communication with any external services related to handling payments or transactions with cryptocurrencies or other Blockchain (or similar systems) based services. In other words, it is a communication module.

The first module 100 comprises a data bus 101 communicatively coupled to a Flash memory 104. Additionally, other components of the system are communicatively coupled to the data bus 101, so that they may be effectively managed by a controller 105.

The Flash memory 104 may store computer program or programs executed by the controller 105 in order to execute steps of the method as described below. Further, the Flash memory 104 may store configuration parameters of the first module 100.

A communication interface(s) module 102 (e.g. Wi-Fi, GSM, 3G, LTE, NFC or the like) is configured to manage communication with the external public network. The communication module 102 may have a dedicated on/off switch so that the user can personally control its operation.

The controller 105 may be a system-on-chip comprising: a graphics processing unit (GPU) 105A that is a specialized electronic circuit designed to rapidly manipulate and alter memory to accelerate the creation of images in a frame buffer intended for output to a display device; a Random Access Memory (RAM) 105B, a Central Processing Unit (CPU) 105C that is an electronic circuitry within a computer that carries out the instructions of a computer program by performing the basic arithmetic, logical, control and input/output (I/O) operations specified by the instructions; a Data Interface 105D responsible to receive and/or transmit data to/from other components of the first module 100.

Typically, the first module 100 is configured to establish, via the communication interface 102, a communication with a remote server, for example an electronic service provider's server, an electronic banking system, or Blockchain (or similar systems) based distributed leaders and networks in order to allow a user to set up a transaction to be securely confirmed once its ready.

Optionally, the first module may comprise a camera 103 configured to obtain and process images such as images of QR codes that may be used as containers specifying transaction data so that a user is relieved from manually inserting or otherwise defining particular variables of a transaction. The camera 103 may have a dedicated on/off switch so that the user can personally control its operation.

Data can be transmitted in an encrypted form between the modules 100 and 300 via an I2C (Inter-Integrated Circuit) or SPI (Serial Peripheral Interface) or another, proprietary interface over the data interface 106 allowing access to the data bus 101.

The first module 100 may be implemented by creating a dedicated device. Alternatively, the components of the first module 100 may be implemented by adapting a typical smartphone or a similar device to configure its modules to operate as described above.

Figure 2:
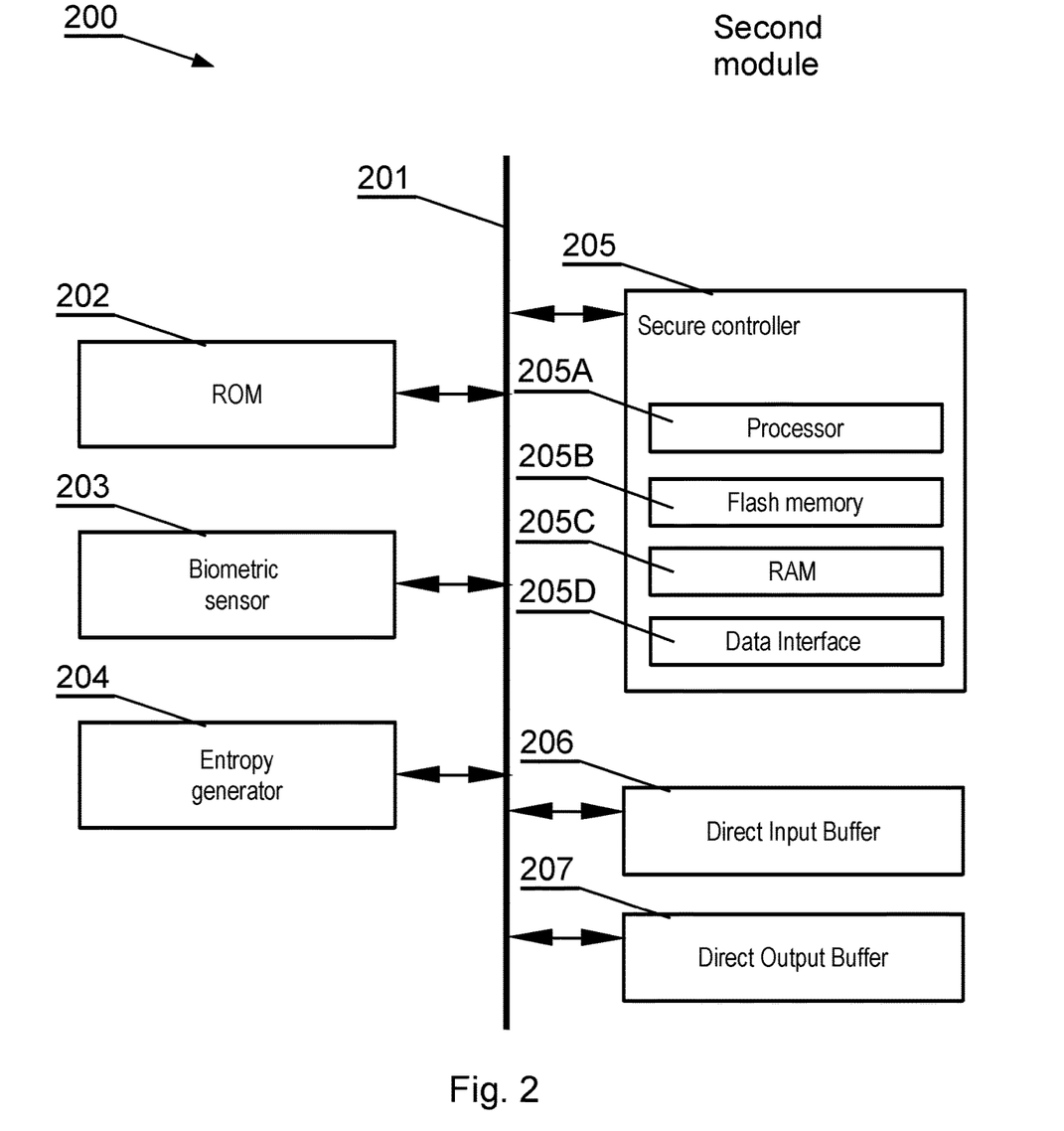
FIG. 2 shows a diagram of a second module of the system presented herein.

FIG. 2 shows a diagram of a second module 200 of the system presented herein. The second module 200 is responsible for transaction authorization and is never connected to a public network (such as the Internet, or even not connected to any network).

The system comprises a data bus 201 communicatively coupled to a ROM memory 202 that stores the operating system of the second module 200 (which, due to being stored in ROM is not prone to modifications) and optionally authorization keys for validating the authenticity of software in the bridge module 300, such as to prevent hacking attempts based on modification of the software of the bridge module 300. Additionally, other components of the system are communicatively coupled to the data bus 201 so that they may be managed by a secure controller 205.

The second module 200 may also comprise (as an option) a biometric sensor 203 configured to convert a biometric trail of a person into an electrical signal. Biometric trails mainly include biometric fingerprint data, iris data, face image, voice samples, etc. This data may serve as an additional transaction authorization mechanism.

A random number generator 204 is a true random number generator, configured to generate random number sequences that are statistically random, i.e. do not have any characteristic and distinguishable features nor generation schemes. These random sequences are used to encrypt data and generates seed words (dictionary words) used for generation of private keys. Preferably, the random number generator 204 is a hardware entropy generator. Random numbers can be also generated by a computer program, not being a stand-alone chip (i.e. a software entropy generator).

A secure controller 205 is configured to manage the components of the second module 200 and in particular to authorize a secure transaction. The secure controller 205 comprises a processor 205A, a Flash memory 205B and operating RAM memory 205C. It stores the private keys and biometric data, i.e. all elements necessary to authorize a secure transaction. The private key may be encrypted wherein its decryption requires a biometric authentication using a stored reference biometric data in the Flash memory 205B and biometric data read from a biometric sensor such as a biometric sensor 203. A Data Interface 205D is responsible to receive and/or transmit data to/from other components of the second module 200.

Figure 3:
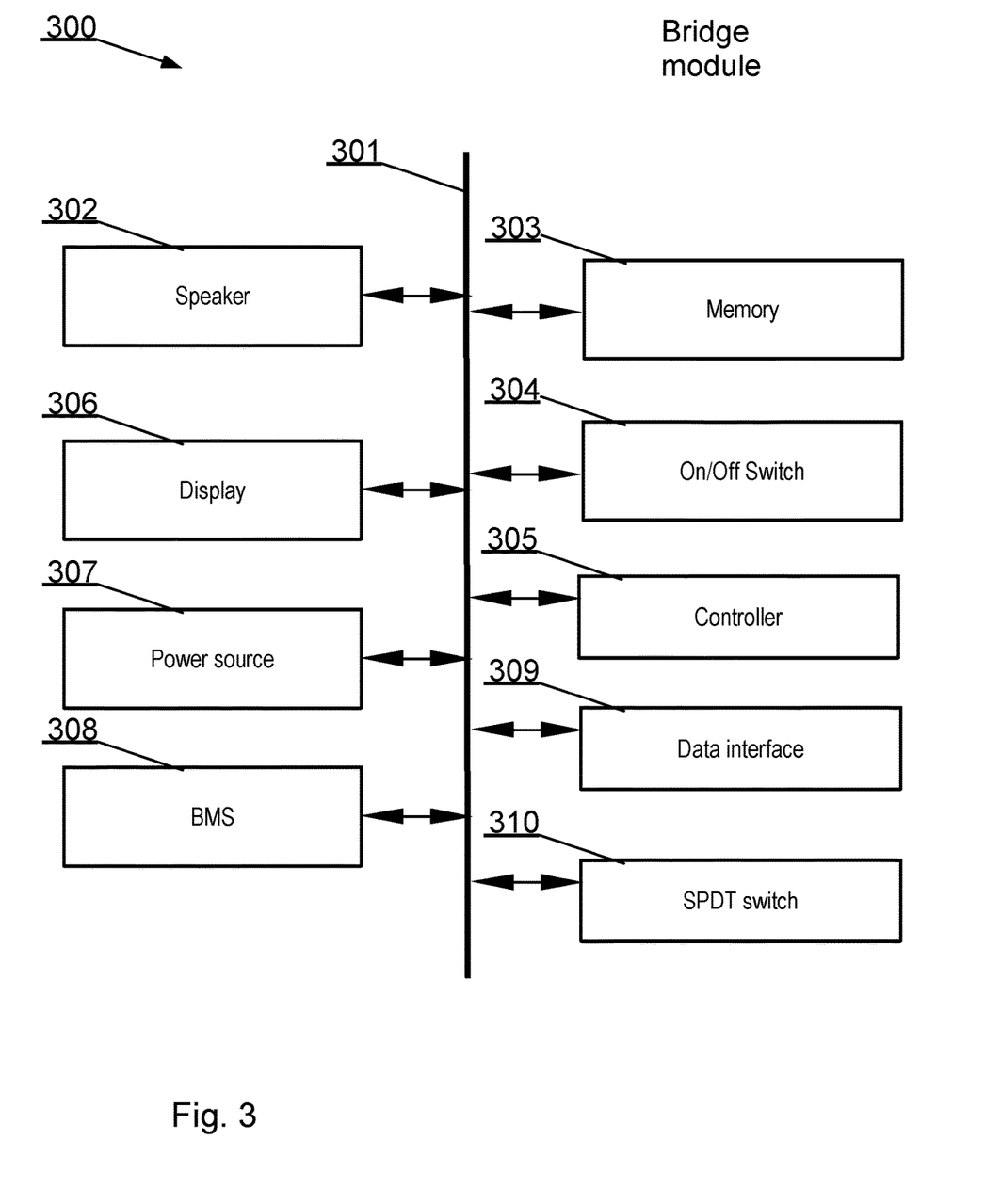
FIG. 3 shows a bridge module operating between the first module and the second module.

Data can be transmitted between the modules 200 and 300 over data interface, preferably in form of data buffers 206, 207 that are configured to communicate with the interface 309 of the bridge module 300 via the SPDT switch 310. The input buffer 206 is accessible by the second module for reading data therefrom and by the bridge module for storing data therein. The output buffer 207 is accessible by the second module for storing data therein and accessible by the bridge module for reading data therefrom. Each of the data buffers 206, 207 may comprise their own internal processing unit, Flash memory and data interfaces for handling communication with the data bus 201 and the secure controller 205, as well as with the data interface 309 of the bridge module 300 via the SPDT switch 310.

The second module 200 may be realized using dedicated components or custom made FPGA or ASIC circuits. The second module 200 along with Bridge module 300 are preferably integrated in a common housing to form a dedicated device that is connectable to the first module (solely via the bridge module) via an external interface, such as a USB interface (in such case the first module functionality can be provided by an application installed on a general-purpose device such as a smartphone or a laptop computer). Alternatively, all modules 100, 200, 300 can be integrated in a common housing to form a fully functional device.

FIG. 3 shows a bridge module 300 that operates between the first module 100 and the second module 200. The purpose of the bridge module 300 is to formulate and pass a transaction request from the first module 100 to the second module 200 and to receive a signed transaction or a refusal of the transaction.

The bridge module 300 integrated with the second module 200 may be realized using dedicated components or custom made FPGA or ASIC circuits. The modules 200, 300 may constitute an additional module connectable to the first module 100 or may be integrated with the first module 100.

The bridge module 300 comprises a data bus 301 communicatively coupled to a memory 303. Additionally, other components of the system are communicatively coupled to the data bus 301 so that they may be managed by a controller 305.

Data can be transmitted at a given time either between the first module 100 and the bridge 300 or between the second module 200 and the bridge 300. For utmost security, the system is configured such that at any time it is not possible for all the three modules 100, 200, 300 to be active at the same time, by use of the SPDT switch 310 that controls the transmission of data and optionally also the supply of power.

The controller 305 may be a system-on-chip comprising the same or similar sub-components as the controller 105.

An on/off switch 304 is configured to switch the device on or off when operated by a user. Other typical components include a display 306, which is preferably a touch-sensitive display, and a speaker 302 that form components for communication with a user.

The bridge module 300 is preferably powered from a battery 307 since it is intended to be operated as a mobile device. Typical battery charging means (such as wireless charging (e.g. according to a Qi standard), as well as typical plug charger connection) may also be present in the bridge module 300 power source 307. A BMS (Battery Management System) module 308 is configured to manage the battery charging, discharging and overall operation such as to keep long life of the battery.

The bridge module 300 comprises data interface 309 that is configured to communicate with the interface 106 of the first module 100 or with the data buffers 206, 207 of the second module 200 both via the SPDT switch 310.

The SPDT (Single Pole, Double Throw) switch module 310 is configured to provide power and data transmission capabilities to only one of the modules at a time: either to the first module 100 or to the second module 200. The module 310 may include two SPDT switches, one for the power and the other for the data transmission, which are always switched together by a single actuator. Having the first module totally disconnected from the power or at least its communication interface(s) 102 totally disconnected from power by a hardware switch, provides additional level of security from an intruder or malicious software, as it has no access to the second module and no possibility to tamper with the transaction request to be signed by the second module.

Other types of switching modules may be used in place of the SPDT switch, as long as they provide the functionality that the data interface 106 of the first module 100 is never connected with the data interface 206, 207 of the second module 200.

FIG. 4 shows an overview of the system comprising the first module 100, the second module 200 and the bridge module 300, wherein the bridge module 300 is selectively connected at any given time either to the first module 100 or to the second module 200 via the SPDT switch 310. The SPDT switch 310 controls transmission of data, and supply of power (at least to the second module).

A wipe module 401 may also be optionally present in the system and configured to instantly invoke a "wipe device" function for security reasons. Once the wipe module 401 is activated, the second module is activated and a command is sent to the second module to delete the private keys, the seed words and biometric data therefrom, in order to restore it's factory settings without personalized data. Next, the first module is activated and the history of transactions, contact addresses and any other address or financial data are removed. The wipe module 401 may have a form of a dedicated "panic button". Alternatively, it may be activated by the user pressing a particular sequence of other buttons.

Therefore, the system 400 is able to solve the transaction security problem by being split into at least three modules: the first module 100, the second module 200 and the bridge module 300 that allows passing the information between the modules 100 and 200 and allows them to operate independently of each other. The second module 200 is configured to authorize and sign a transaction using private keys (in particular by providing a password or a PIN code or biometric data or the like) while never being connected to a public network (such as the Internet).

In particular, the second module 200 is never connected to a public network, because the bridge module 300 at any given instance can be connected either to the first module 100 or to the second module 200. Therefore, it is impossible to for an remote entity (a hacker or a machine operating a spying software) to capture authorization data from the device presented herein. The first module 100 also does not have any form of access to the data and content of the second module 200.

Figure 5:
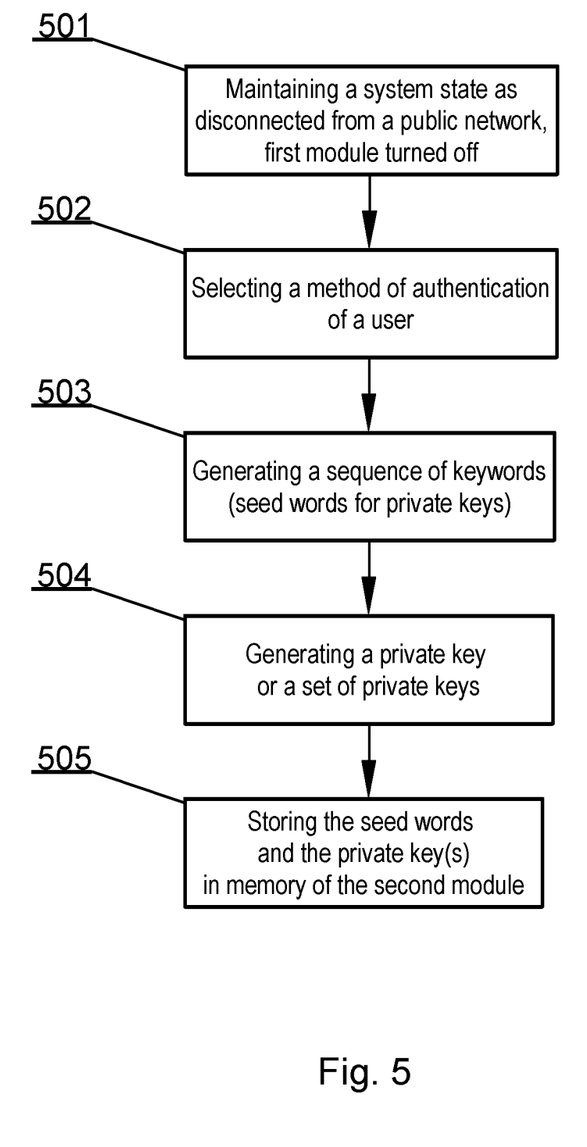
FIG. 5 shows a process of configuring the system of FIG. 4.

FIG. 5 shows a configuration process of the system 400. At step 501 the system 400 remains disconnected from a public network, as the first module is turned off. Next, at step 502, a method of authentication of a user is selected, for example a PIN, a password, a biometric scan or the like. The parameters of authentication and relevant responses are stored in the secure controller 205 of the second module 200. Subsequently, at step 503, a sequence of keywords (a seed) is generated, according to the known methods, in particular related to handling deterministic wallets for cryptocurrencies. The seed can be used for restoring access to the device when the private keys have been reset. For example, the second module 200 may comprise within the ROM memory 202 a dictionary, e.g. according to the BIP-39 standard, that allows generating a sequence of keywords in a random manner. The sequence of keywords may comprise as many as 24 or 36 keywords, which mitigates a risk of having two devices with the same random sequence of keywords. Next, in step 504, a private key or a set of keys is generated on the basis of the seed. The private key(s) and the sequence of keywords are stored 505 in the Flash memory of the secure controller 205 of the second module 200, which may be additionally encrypted using password, PIN or biometric trail to ensure increased level of security to the device. After the process of FIG. 5 has been executed, the system 400 may configure and initiate the first module 100, along with connection of the communication module 102 with an external, public network, such as the Internet.

Figure 6:
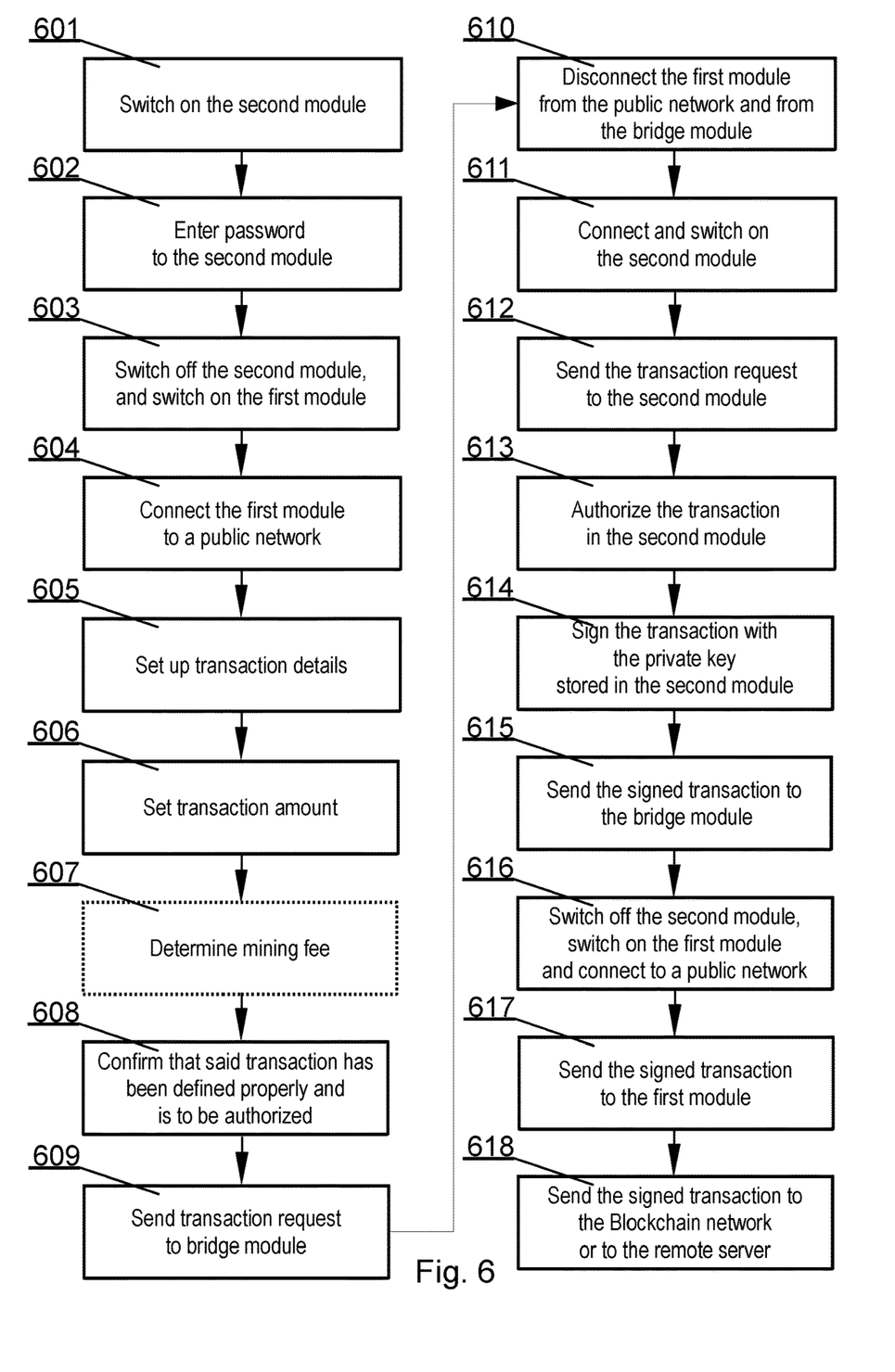
FIG. 6 shows a method of transaction authentication.

FIG. 6 shows a method of transaction authentication using the device presented herein. First, the second module 200 is switched on in step 601 and in step 602 the user authorizes access to the device by entering a password, a PIN or biometric data, in order to allow further access to the device. If the password entered is approved, the second module 200 is switched off and the first module 100 is switched on.

Next, at step 604 the first module 100 is connected to a public network (for example an online service, a bank, a currency exchange service, Blockchain network, Internet network) and at step 605 transaction details are set up (such as the recipient data, purpose etc.) and at step 606 an amount of the transaction is given. To this end, the remote server of the external, public network, or an application installed at the first module 100, will typically provide a suitable user interface allowing to input any relevant information required to setup the transaction.

Next, at step 607, a so-called mining fee may be determined, which is typical in cryptocurrencies (in case of regular currencies, other transaction fees may be determined at this step). Subsequently, a user may confirm at step 608 (the first module 100 receives a confirmation from the user) that said transaction has been defined properly and that said transaction is to be authorized.

If the user wishes to authorize said transaction, the first module 100, which is already in possession of transaction details, sends the transaction request to the bridge module in step 609 and is disconnected at step 610 from said public network. The first module 100 is then also disconnected communicatively from the bridge by the SPDT switch 310.

Next, the second module 200 is switched on at step 611 (using said SPDT Switch 310), and receives the transaction request from the bridge module in step 612. The user authorizes the transaction via the second module 200 in step 613 using input data such as a password, PIN and/or biometric data. The user, before providing it's credentials, will have the possibility to double-check the transaction details in the second module mode, as it will be displayed on a screen. It is therefore another layer of security, which can be summarized as "What you see (sign) is what you get (the transaction)". As already discussed, the authorization takes place when the device is disconnected from the external public network and the first module has no access to any data.

Further, the transaction is signed at step 614 with the private key stored in the secure controller 205 of the second module. Next, the second module 200 sends the signed transaction at step 615 to the bridge module 300.

Then, in step 616 the second module 200 is switched off and the first module 100 is switched on and connected to the public network via the communication interface 102. The bridge module 300 sends the signed transaction to the first module 100 in step 617 and at step 618 the first module 100 sends the signed transaction to the Blockchain network or to the remote server.

Optionally, when a user cannot authorize a transaction during a predefined number of consecutive attempts (for example 3 or 5 attempts) the second module may execute the wipe operation as discussed with respect to the functionality of the wipe module 401 and await a new activation using the aforementioned sequence of keywords (see FIG. 5).

The presented method and system allow to improve security of electronic wallets while not compromising ease of use. Therefore, they provide a useful, concrete and tangible result.

According to the present disclosure, a device is presented which is responsible for secure storage of private keys to access and perform transactions with electronic currencies, such as cryptocurrencies and other Blockchain based or stored content. Therefore, the machine or transformation test is fulfilled and that the idea is not abstract.

At least parts of the methods disclosed herein may be computer implemented. Accordingly, the system may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present system may take the form of a computer program product embodied in any tangible medium of expression having computer usable program code embodied in the medium.

It can be easily recognized, by one skilled in the art, that the aforementioned method for signing transactions over a virtual air gap, may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the system and method presented herein has been depicted, described, and has been defined with reference to particular preferred embodiments, such references and examples of implementation in the foregoing specification do not imply any limitation on the method or system. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A system for signing transactions, the system comprising:
    a first module comprising:
        a communication interface to a public network,
        a controller configured to handle a transaction with a Blockchain network or a transaction server accessible at the public network, and
        a data interface for communicating with the controller;
    a second module comprising:
        a random number generator for generating random sequences,
        a secure controller comprising a flash memory and configured to generate seed words and private keys based on the random sequences generated by the random number generator and to store the seed words and the private keys in said flash memory and to sign a transaction request using said private keys by generating a signed transaction, and
        a data interface for communicating with the secure controller; and
    a bridge module comprising:
        a controller,
        a data interface for communicating with the controller of the bridge module, and
        a switch configured to selectively connect the data interface of the bridge module to either the data interface of the first module or the data interface of the second module such that the data interface of the first module is never connected with the data interface of the second module, wherein the second module is never connected to the public network,
        wherein the controller of the bridge module is configured to receive a transaction request from the first module, pass the transaction request to the second module, receive the signed transaction from the second module and pass the received signed transaction to the first module.

2. The system according to claim 1, wherein the switch is a single pole, double throw (SPDT) switch.

3. The system according to claim 1, wherein the secure controller of the second module is further configured to store biometric data in said flash memory.

4. The system according to claim 1, wherein the second module comprises a biometric sensor configured to convert a biometric trail of a person into an electrical signal for transaction authorization.

5. The system according to claim 1, wherein the switch is further configured to provide power to the second module only when the data interface of the bridge module is connected with the data interface of the second module.

6. The system according to claim 1, further comprising a wipe module configured to invoke a wipe function at the second module to delete the stored seed words and private keys, and to wipe all transaction and financial data from the first module.

7. The system according to claim 1, wherein the second module is integrated with the bridge module in a common housing.

8. The system according to claim 1, wherein the first module is integrated with the second module and the bridge module in a common housing.

9. The system according to claim 1, wherein the data interface of the second module comprises an input data buffer and an output data buffer.

10. The system according to claim 1, wherein the random number generator of the second module is a hardware entropy generator.

11. The system according to claim 1, wherein the random number generator of the second module is a software entropy generator.

12. A method for signing transactions using a system for signing transactions, the system comprising:
    a first module comprising:
        a communication interface to a public network,
        a controller configured to handle a transaction with a Blockchain network or a transaction server accessible at the public network, and
        a data interface for communicating with the controller;
    a second module comprising:
        a random number generator for generating random sequences,
        a secure controller comprising a flash memory and configured to generate seed words and private keys based on the random sequences generated by the random number generator and to store the seed words and the private keys in said flash memory and to sign a transaction request using said private keys by generating a signed transaction, and
        a data interface for communicating with the secure controller; and
    a bridge module comprising:
        a controller,
        a data interface for communicating with the controller of the bridge module, and a switch configured to selectively connect the data interface of the bridge module to either the data interface of the first module or the data interface of the second module such that the data interface of the first module is never connected with the data interface of the second module, wherein the second module is never connected to the public network, wherein the controller of the bridge module is configured to receive a transaction request from the first module, pass the transaction request to the second module, receive the signed transaction from the second module and pass the received signed transaction to the first module, the method comprising the steps of:
- connecting the first module to the public network;
- setting up transaction details; receiving acceptance that said transaction is to be authorized; sending the transaction request to the bridge module;
- disconnecting the first module from the bridge module;
- connecting the bridge module to the second module;
- sending the transaction request from the bridge module to the second module;
- authorizing the transaction via the second module;
- signing the transaction with the private key stored in the second module to generate the signed transaction;
- sending the signed transaction from the second module to the bridge module;
- disconnecting the second module from the bridge module;
- connecting the first module to the bridge module;
- sending the signed transaction from the bridge module to the first module; and
- sending the signed transaction from the first module to the Blockchain network or to the transaction server.

13. The method according to claim 12, further comprising, when a user does not authorize a transaction during a predefined number of consecutive attempts at the second module, invoking a wipe function at the second module to delete the stored seed words and private keys, and to wipe all transaction and financial data from the first module.

* * * * *